(12) United States Patent
Kumar et al.

(10) Patent No.: US 12,417,244 B2
(45) Date of Patent: Sep. 16, 2025

(54) DETERMINING USER AFFINITIES FOR CONTENT GENERATION APPLICATIONS

(71) Applicant: Adobe Inc., San Jose, CA (US)

(72) Inventors: Yaman Kumar, New Delhi (IN); Vinh Ngoc Khuc, Campbell, CA (US); Vijay Srivastava, Cupertino, CA (US); Umang Moorarka, Chhattisgarh (IN); Sukriti Verma, Rohini (IN); Simra Shahid, Uttar Pradesh (IN); Shirsh Bansal, Uttar Pradesh (IN); Shankar Venkitachalam, Santa Clara, CA (US); Sean Steimer, San Jose, CA (US); Sandipan Karmakar, Fremont, CA (US); Nimish Srivastav, Santa Clara, CA (US); Nikaash Puri, New Delhi (IN); Mihir Naware, Redwood City, CA (US); Kunal Kumar Jain, Chennai (IN); Kumar Mrityunjay Singh, Bengaluru (IN); Hyman Chung, San Ramon, CA (US); Horea Bacila, London (GB); Florin Silviu Iordache, Bucharest (RO); Deepak Pai, Sunnyvale, CA (US); Balaji Krishnamurthy, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/656,332

(22) Filed: May 6, 2024

(65) Prior Publication Data

US 2024/0289380 A1 Aug. 29, 2024

Related U.S. Application Data

(63) Continuation of application No. 17/447,908, filed on Sep. 16, 2021, now Pat. No. 12,008,033.

(51) Int. Cl.
*G06F 7/02* (2006.01)
*G06F 16/00* (2019.01)
(Continued)

(52) U.S. Cl.
CPC ........ *G06F 16/5866* (2019.01); *G06F 16/535* (2019.01); *G06F 16/54* (2019.01); *G06F 16/583* (2019.01); *G06N 20/00* (2019.01)

(58) Field of Classification Search
CPC .. G06F 16/5866; G06F 16/583; G06F 16/535; G06F 16/54; G06N 20/00
See application file for complete search history.

(56) References Cited

U.S. PATENT DOCUMENTS 10,244,286 B1 * 3/2019 Jia ..................... H04N 21/44224
2009/0063568 A1 * 3/2009 Choe .................... G06F 16/437
(Continued)

OTHER PUBLICATIONS

Notice of Allowance received for U.S. Appl. No. 17/447,908, mailed on Feb. 15, 2024, 9 pages.

*Primary Examiner* — Bruce M Moser
(74) *Attorney, Agent, or Firm* — Shook, Hardy & Bacon L.L.P.

(57) ABSTRACT

Methods, computer systems, computer-storage media, and graphical user interfaces are provided for determining user affinities by tracking historical user interactions with tagged digital content and using the user affinities in content generation applications. Accordingly, the system may track user interactions with published digital content in order to generate user interaction reports whenever a user engages with the digital content. The system may aggregate the interaction reports to generate an affinity profile for a user or audience of users. A marketer may then generate digital content for a target user or audience of users and the system may process the digital content to generate a set of tags for the digital content. Based on the set of tags, the system may then (Continued)

evaluate the digital content in view of the affinity profile for the target user/audience to determine similarities or differences between the digital content and the affinity profile.

20 Claims, 6 Drawing Sheets

(51) Int. Cl.
*G06F 16/535* (2019.01)
*G06F 16/54* (2019.01)
*G06F 16/58* (2019.01)
*G06F 16/583* (2019.01)
*G06N 20/00* (2019.01)

(56) References Cited

U.S. PATENT DOCUMENTS

| | | | |
|---|---|---|---|
| 2014/0344248 A1 | 11/2014 | Stoop et al. | |
| 2015/0220950 A1* | 8/2015 | Hsiao | G06N 20/10 |
| | | | 705/7.32 |
| 2019/0163829 A1* | 5/2019 | Puri | G06Q 30/02 |
| 2019/0373297 A1 | 12/2019 | Sarkhel et al. | |
| 2022/0300124 A1* | 9/2022 | Ahas | G06F 3/0485 |
| 2022/0405407 A1 | 12/2022 | Bai et al. | |
| 2023/0156284 A1 | 5/2023 | Menendez | |

* cited by examiner

PUBLISH, TO AN INTERNET CONNECTED MEDIA PLATFORM, A FIRST DIGITAL CONTENT AND CORRESPONDING METADATA THAT INCLUDES A SET OF TAGS ASSOCIATED WITH A CHARACTERISTIC OF A GRAPHICAL IMAGE AND A LINGUISTIC ELEMENT IN THE FIRST DIGITAL CONTENT
302

IDENTIFY A USER INTERACTION BY A USER WITH THE FIRST DIGITAL CONTENT
304

BASED ON THE IDENTIFIED USER INTERACTION BY THE USER, GENERATE AN AFFINITY PROFILE FOR THE USER BY ACCESSING AN INTERACTION REPORT THAT INCLUDES THE SET OF TAGS ASSOCIATED WITH THE CHARACTERISTIC OF THE GRAPHICAL IMAGE AND THE LINGUISTIC ELEMENT IN THE FIRST DIGITAL CONTENT, AND MODIFYING AT LEAST ONE AFFINITY VALUE FOR A GRAPHICAL CATEGORY OR A LINGUISTIC CATEGORY BASED ON THE SET OF TAGS INCLUDED IN THE INTERACTION REPORT
306

PROCESS THE AFFINITY PROFILE AND A SECOND DIGITAL CONTENT PRIOR TO PUBLICATION OF THE SECOND DIGITAL CONTENT TO THE INTERNET CONNECTED MEDIA PLATFORM TO DETERMINE A SIMILARITY BETWEEN THE AFFINITY PROFILE AND THE SECOND DIGITAL CONTENT FOR THE GRAPHICAL CATEGORY AND THE LINGUISTIC CATEGORY
308

FIG. 3

```
┌─────────────────────────────────────────────────────────┐
│ GENERATE AN AFFINITY PROFILE FOR A USER, THE AFFINITY   │
│ PROFILE INCLUDING A FIRST SET OF TAGS ASSOCIATED WITH A │
│ FIRST SET OF CHARACTERISTICS OF A FIRST GRAPHICAL IMAGE │
│ AND A FIRST LINGUISTIC ELEMENT IN A FIRST DIGITAL       │
│ CONTENT                                                 │
│                          502                            │
└─────────────────────────────────────────────────────────┘
                              │
                              ▼
┌─────────────────────────────────────────────────────────┐
│ IDENTIFY A SECOND SET OF TAGS ASSOCIATED WITH A SECOND  │
│ SET OF CHARACTERISTICS OF A SECOND GRAPHICAL IMAGE AND  │
│ A SECOND LINGUISTIC ELEMENT IN A SECOND DIGITAL CONTENT │
│                          504                            │
└─────────────────────────────────────────────────────────┘
                              │
                              ▼
┌─────────────────────────────────────────────────────────┐
│ PROCESS, BY A MACHINE LEARNING MODEL, THE SECOND SET OF │
│ TAGS ASSOCIATED WITH THE SECOND DIGITAL CONTENT AND THE │
│ FIRST SET OF TAGS IN THE AFFINITY PROFILE OF THE USER TO│
│ DETERMINE AN EXTENT OF SIMILARITY BETWEEN THE SECOND SET│
│ OF TAGS ASSOCIATED WITH THE SECOND DIGITAL CONTENT AND  │
│ THE FIRST SET OF TAGS IN THE AFFINITY PROFILE OF THE USER│
│                          506                            │
└─────────────────────────────────────────────────────────┘
                              │
                              ▼
┌─────────────────────────────────────────────────────────┐
│ PROVIDE, FOR DISPLAY, THE EXTENT OF SIMILARITY TO       │
│ INDICATE A PREDICTED USER AFFINITY FOR THE SECOND       │
│ DIGITAL CONTENT                                         │
│                          508                            │
└─────────────────────────────────────────────────────────┘
```

FIG. 5

DETERMINING USER AFFINITIES FOR CONTENT GENERATION APPLICATIONS

CROSS-REFERENCE TO RELATED APPLICATIONS

This patent application is a Continuation application that claims priority to, and the benefit of, of U.S. patent application Ser. No. 17/447,908 titled "DETERMINING USER AFFINITIES FOR CONTENT GENERATION APPLICATIONS", filed on Sep. 16, 2021, which is incorporated by reference herein in its entirety.

BACKGROUND

Users are often attracted to specific visual and linguistic characteristics of digital content—such as advertisements, videos, product reviews, and other digital media. However, because it can be difficult to determine what characteristics will engage users, systems for delivering the on-line ad campaign content are often uninformed as to what will resonate with the users and cause them to engage with the digital content. For example, when a new on-line ad campaign begins or the on-line ad campaign content changes, systems for delivering the on-line ad campaign content often have very little information to use to predict the efficacy of the new or changed on-line ad campaign for a specific segment of customers or users.

In some conventional solutions, systems for delivering on-line ad campaign content experiment with multiple variations of digital content by randomly presenting different digital content to different users and tracking the outcome of each variation to make decisions on which of the presented digital content best engages the users (e.g., A/B testing). However, while these experiments provide these systems with certain performance insights for the presented digital content, the data provides very little insight into which specific characteristics of the presented digital content correlate with and/or cause a positive or negative performance of digital content for specific users and/or audiences. Accordingly, conventional systems for delivering on-line ad campaign content are unable to evaluate digital content against these specific content characteristics to predict the effectiveness of the digital content for specific users and/or audiences.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, determining user affinities by tracking historical user interactions with tagged digital content and using the user affinities in content generation applications. In this regard, in some embodiments, the system tracks user interactions with published digital content in order to generate user interaction reports whenever a user engages with the digital content. The interaction report includes metadata associated with the user selection as well as one or more tags associated with the digital content stored in metadata associated with the digital content. The system aggregates the interaction reports to generate an affinity profile for a user or audience of users. A marketer can then generate digital content for a target user or audience of users, and the system will process the digital content to generate a set of tags for the digital content. Based on the set of tags, the system then evaluates the digital content in view of the affinity profile for the target user/audience to determine similarities or differences between the digital content and the affinity profile. Using the similarities or differences, the system will provide the marketer with real-time feedback regarding the digital content to enable the marketer to edit the digital content and generate digital content that is predicted to be attractive to the target user/audience.

BRIEF DESCRIPTION OF THE DRAWINGS

The technology described herein is described in detail below with reference to the attached drawing figures, wherein:

FIG. 2 illustrates an example user interface for evaluating content in real-time based on one or more affinity profiles, in accordance with aspects of the technology described herein;

FIG. 3 provides a first example method for determining user affinities by tracking user interactions with tagged digital content and using the user affinities in content generation applications, in accordance with aspects of the technology described herein;

FIG. 5 provides a third example method for determining user affinities by tracking user interactions with tagged digital content and using the user affinities in content generation applications, in accordance with aspects of the technology described herein.

DETAILED DESCRIPTION

Figure 1:
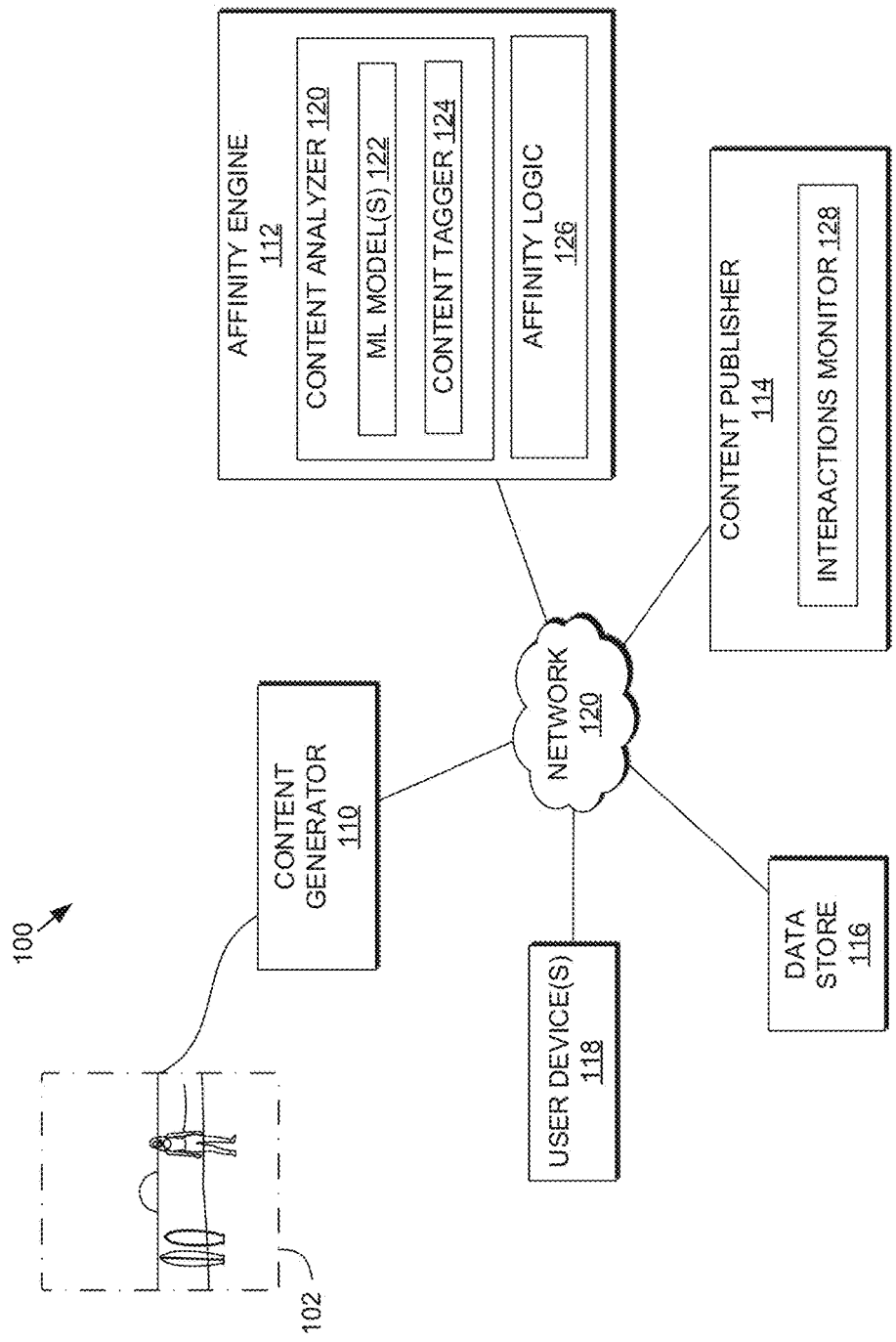
FIG. 1 is a block diagram of an exemplary system for determining and using affinity profiles, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

As different users are often drawn to different visual and linguistic characteristics of digital content, systems for delivering on-line ad campaign content collect data to provide insights into what digital content will attract the most users and/or a specific audience of users. An understanding of user affinities can be influential and facilitate decision making when selecting and/or generating content.

In some conventional solutions, systems for delivering on-line ad campaign content experiment with multiple variations of digital content by randomly presenting different digital content to different users. For example, systems for delivering on-line ad campaign content can experiment with two or more advertisements for a product by randomly presenting the two or more advertisements to users who visit a webpage (e.g., A/B testing). Then, these systems will track user engagement with the two of more advertisements. Using the outcome of this experiment, these systems might make decisions on which of the displayed advertisements best engages the users. However, while these experiments may provide certain performance insights for a variety of displayed content, it is often very resource intensive to collect enough data from these experiments to provide a reliable confidence level regarding which displayed advertisements best engage users. Moreover, the data provides very little insight into which specific characteristics of the displayed content correlate with and/or cause a positive or negative performance of the content. Accordingly, these conventional systems for delivering on-line ad campaign content are unable to evaluate digital content against specific content characteristics that are be known to correlate with and/or cause a positive or negative performance of digital content.

As such, embodiments described herein facilitate determining user affinities by tracking historical user interactions with tagged digital content and using the user affinities in content generation applications. Advantageously, and in contrast to conventional solutions, the system tracks user interactions with published digital content (e.g., digital content that is published on-line, to an e-mail, on social media, or other digital platform that is connected to the internet) in order to generate user interaction reports whenever a user engages with the digital content. In some embodiments, the system aggregates the interaction reports to generate an affinity profile for a user or audience of users. The system then receives digital content that is generated for a target user or audience of users and processes the digital content to generate a set of tags for the digital content. Based on the set of tags, the system then evaluates the digital content in view of the affinity profile for the target user/audience to determine similarities or differences between the digital content and the affinity profile. In this way, embodiments of the present disclosure can efficiently collect data to generate one or more affinity profiles without the need for extensive A/B experiments, which preserves system resources and provides insights into user preferences not available in conventional systems. Additionally, such embodiments can provide real-time feedback to marketers while they are generating digital content prior to publication of the digital content.

In some embodiments, initially, a marketer can select and/or generate digital content to be presented to a user without a knowledge of a user's affinity for digital content characteristics. For example, the marketer can generate an advertisement—e.g., using ADOBE Experience Manager (AEM), which allows brands to manage their image assets to build advertisements, websites, mobile apps, and forms—that includes a graphic image and one or more words.

The system then receives and processes the digital content by one or more machine learning models that are trained to determine/extract one or more attributes, objects, entities and/or characteristics of the digital content. For example, the one or more machine learning models—such as Adobe Sensei—can process the digital content to determine one or more image templates, image elements (e.g., such as a color, a model ID, model characteristics, clothes type, patterns, fabric style, scene elements, and other visual elements present in the digital content), keywords, image sentiment, text readability, text sentiment, and/or other characteristics of the digital content. The system then generates, and/or select from a predetermined list, one or more tags (e.g., labels, descriptions, or other informative identifier) for each of the characteristics. These tags are embedded within metadata associated with the digital content.

In some embodiments, after the one or more tags have been embedded within the metadata associated with the digital content, the system uploads and publishes the digital content—e.g., using a service/application such as AEM—along with the metadata that includes the one or more tags, to a digital platform—such as a website, a mobile application, server, and/or other platform that is accessible by a user device (e.g., personal computer, mobile phone, mobile tablet, AR/VR device, etc.). In some embodiments, the digital content is published to a website and the associated metadata is also published, separate from the digital content, to a server and/or database. The system then tracks user interactions with the digital content in order to generate user interaction reports whenever a user engages with the digital content. For example, if a user browsing a web page is presented with an advertisement of a woman in a dress that includes a selectable element to "Shop Now" and the user selects the element, the system generates an interaction report based on the selection.

The interaction report includes metadata associated with the user selection as well as one or more of the tags associated with the digital content stored in the metadata associated with the digital content. For example, the interaction report can include, a timestamp corresponding to the user selection, a URL for the web page, a user ID, an interaction type (e.g., click, view video, etc.), and one or more tags for a template type, image elements, headline length, keywords, sentiment, text readability, and any additional tags associated with the digital content. In some embodiments where the interaction report is generated by a separate system or separate component of the system, the interaction report is sent to the system and stored in association with the user.

In some embodiments, the system aggregates and/or processes one or more interaction reports to generate an affinity profile for a user. One or more tags included in the interaction report are stored in association with the affinity profile. For example, based on a plurality of interaction reports, the system determines (e.g., from a set of tags included in the plurality of interaction reports) a user's preferred colors, headline length, preferred reading level, sentiment, and other characteristics for digital content. Users with similar affinity profiles are clustered to generate one or more user audiences. For example, the system can cluster together a group of users whom the system has determined each have an affinity for digital content that has an informal sentiment, is related to fashion, and includes headlines that are 4 words or less. In some cases, a marketer will be provided with a user interface to allow the marketer to generate a custom audience by selecting specific user affinities. For example, the marketer will be presented with a set of tags for digital content and the system will receive the marketer's selection. The system then uses the marketer's selections to search for affinity profiles that correlate with the marketer's selections and generate a custom audience of users with affinity profiles that correlate well with the marketer's selections.

In some embodiments, generated and/or selected digital content is evaluated to predict a user's and/or audience's affinity for the digital content. For example, as mentioned above, the system processes digital content by a machine learning model(s) and generate a digital tag(s) associated with the digital content. A marketer can then select a user(s) and/or audience(s) for the digital content. Based on the digital tag(s) and the user(s) and/or audience(s) for the digital content, the system evaluates the digital content in view of the user(s) and/or audience(s) for the digital content to predict user affinity for the digital content. For instance, while each user has an associated affinity profile, an affinity profile can also be generated for an audience of users. In this way, the marketer is able to test the digital content for a user(s) and/or audience(s) without the need to publish the digital content and wait to see whether the digital is successful.

In some embodiments, an item(s) in a marketer's content library is evaluated in view of an affinity profile(s) associated with the marketer's customers to recommend and/or retire content. For example, assume that a high percentage of the affinity profiles for the marketer's customers include an affinity for images having the ocean in the background and warm color tones. In such a case, the tags generated for the items in the content library can be compared to provide content recommendations to the marketer. In some cases, the affinity profiles are used to rank the content in the content library to promote content that includes desired characteristics towards the top of the content library. Alternatively or additionally, the affinity profiles are used to proactively replace and/or remove content that has a low correlation with the affinity profiles associated with the marketer's customers.

Having briefly described an overview of aspects of the present technology, various terms used throughout this description are provided. Although more details regarding various terms are provided throughout this description, general descriptions of some terms are included below to provider a clearer understanding of the ideas disclosed herein:

An affinity profile generally refers to a description of preferences for different characteristics of digital content. An affinity profile is generated based on one or more received interaction reports that are processed to determine preferences for digital content. An affinity profile can be generated to include preferences for a single user or for multiple users (e.g., an audience of users).

Digital tags generally refer to digital labels, descriptions, and/or other informative identifiers that characterize one or more attributes, objects, entities and/or characteristics of the digital content. For example, the one or more machine learning models process digital content to determine one or more image templates, image elements (e.g., such as a color, a model ID, model characteristics, clothes type, patterns, fabric style, scene elements, and other visual elements present in the digital content), keywords, image sentiment, text readability, text sentiment, and/or other characteristics of the digital content. The system then generates, and/or selects from a predetermined list, one or more digital tags (e.g., labels, descriptions, or other informative identifier) for each of the characteristics.

An interaction report generally refers to a digital output from the system that includes metadata associated with a user selection as well as one or more digital tags associated with digital content stored in metadata associated with the digital content. For example, the interaction report can include a timestamp corresponding to the user selection, a URL for the web page, a user ID, an interaction type (e.g., click, view video, etc.), and one or more tags for a template type, image elements, headline length, keywords, sentiment, text readability, and any additional tags associated with the digital content.

An affinity score generally refers to an aggregate of one or more computed affinities for digital content in view of each category in a target user/audience's affinity profile. An affinity score is computed based on comparing similarities and/or differences between a target user/audience's affinity profile and a set of tags that are generated for digital content. The affinity score can be presented as a numeric indicator, a binary indicator (e.g., checkmark or exclamation point), an arrow on a scale, or other presentation method to indicate to a marketer whether, and to what extent, digital content aligns with an affinity profile.

Overview of Exemplary Environments for Determining and Using Affinity Profiles

Referring initially to FIG. 1, FIG. 1 is a block diagram of an exemplary network environment 100 suitable for use in implementing embodiments described herein is shown. Generally, the system 100 illustrates an environment suitable for determining user affinities by tracking historical user interactions with tagged digital content and using the user affinities in content generation applications. Among other things, embodiments described herein effectively and efficiently provide real-time, offline, and/or batched feedback to a marketer regarding user affinities with respect to content generated by the marketer In this regard, the system receives digital content that is generated for a target user/audience and, based on one or more user affinity profile(s) and a set of tags for the generated content, automatically provide a prediction of whether the target user/audience will be attracted to the content.

The network environment 100 includes a content generator 110, an affinity engine 112, a content publisher 114, a data store 116, and a user device 118. The content generator 110, affinity engine 112, content publisher 114, data store 116, and user device 118 can communicate through a network 120, which includes any number of networks such as, for example, a local area network (LAN), a wide area network (WAN), the Internet, a cellular network, a peer-to-peer (P2P) network, a mobile network, or a combination of networks.

The network environment 100 shown in FIG. 1 is an example of one suitable network environment and is not intended to suggest any limitation as to the scope of use or functionality of embodiments disclosed throughout this document. Neither should the exemplary network environment 100 be interpreted as having any dependency or requirement related to any single component or combination of components illustrated therein. In some examples, the user device 118 and content generator 110 will be in communication with the data store 116 via a mobile network or the Internet, and the data store 116 will be in communication with content publisher 114 via a local area network. In some further embodiments, although the environment 100 is illustrated with a network, one or more of the components will directly communicate with one another, for example, via HDMI (high-definition multimedia interface), and DVI (digital visual interface). Alternatively, one or more components will be integrated with one another, for example, at least a portion of the content generator 110 and/or data store 116 will be integrated with the affinity engine 114 and/or content publisher 114. The data store 116 will include digital content that can be accessed by the marketer via the user device 118 and/or the content generator 110.

The user device 118 can be any kind of computing device capable using user affinities in content generation applications, determining user affinities, and/or viewing a visualization of a predicted affinity for content. For example, in an embodiment, the user device 118 can be a computing device such as computing device 600, as described above with reference to FIG. 6. In embodiments, the user device 118 can be a personal computer (PC), a laptop computer, a workstation, a mobile computing device, a PDA, a cell phone, or the like.

The user device can include one or more processors and one or more computer-readable media. The computer-readable media includes computer-readable instructions executable by the one or more processors. The instructions are embodied by one or more applications, such as an application that is found on, a part of, or configured to use one or more of the content generator 110, the affinity engine 112, the content publisher 114, the data store 116, and the user device 118. The application(s) can generally be any application capable of facilitating determining user affinities by tracking historical user interactions with tagged digital content and using the user affinities for content generation. In some implementations, the application(s) comprises a web application, which can run in a web browser, and could be hosted at least partially server-side (e.g., via content generator 110, affinity engine 112 or content publisher 114). In addition, or instead, the application(s) can comprise a dedicated application. In some cases, the application is integrated into the operating system (e.g., as a service).

In some examples, the user device 118 can be a client device on a client-side of the operating environment 100, while the content generator 110, the affinity engine 112 and/or the content publisher 114 can be on a server-side of the operating environment 100. In some embodiments, the content generator 110, the affinity engine 112 and/or the content publisher 114 comprise server-side software designed to work in conjunction with client-side software on user device 118 so as to implement any combination of the features and functionalities discussed in the present disclosure. This division of the operating environment 100 is provided to illustrate one example of a suitable environment, and it is noted there is no requirement for each implementation that any combination of the user device 110, the content generator 110, the affinity engine 112 and/or the content publisher 114 to remain as separate entities.

A user device 118, as described herein, is operated by an individual or entity—such as a marketer—to generate content using one or more affinity profiles. As can be appreciated, a marketer without a knowledge of a user's (e.g., a customer's) affinity for digital content characteristics, initially uses one or more of the user device(s) to interact with the content generator 110 to select, modify and/or generate digital content to be presented to a user or an audience of users. Selected, modified and/or generated digital content (collectively referred to herein as "the generated digital content 102") are provided to the affinity engine 112. A content analyzer 120 of the affinity engine 112 processes the generated digital content 102 by one or more machine learning (ML) models 122.

Generally, the ML model 122 is a neural network(s) that can model complex non-linear relationships by generating hidden vector outputs along a sequence of inputs, such as generated digital content 102. In particular, the ML model 122 can include a model of interconnected digital neurons that can approximate complex functions and generate outputs—such as digital tags-based on the generated digital content 102 provided to the ML model 122. The ML model 122 can include one or more deep learning models, including convolutional neural networks, recurrent neural networks, deep neural networks, and deep stacking networks, to name a few examples. The ML model 122 includes or otherwise makes use of one or more machine learning algorithms to learn from training data. In other words, the ML model 122 can include an algorithm that implements deep learning techniques such as machine learning to attempt to model high-level abstractions in data. An example implementation includes a convolutional neural network including convolutional layers, pooling layers, and/or other layer types.

In some embodiments, by processing the generated digital content 102, the ML model 122 determines one or more image templates, image elements (e.g., such as a color, a model ID, model characteristics, clothes type, patterns, fabric style, scene elements, and other visual elements present in the generated digital content 102), keywords, image sentiment, text readability, text sentiment, and/or other characteristics of the generated digital content 102. The ML model 122 then generates, and/or selects from a predetermined list one or more digital tags (e.g., labels, descriptions, or other informative identifier) for each determined characteristic of the generated digital content 102. A content tagger 124 then embeds these digital tags within metadata associated with the generated digital content 102.

In some embodiments, after the one or more digital tags have been embedded within the metadata associated with the generated digital content 102, the generated digital content 102 is provided to the content publisher 114. The content publisher 114 then uploads and publishes the generated digital content 102, along with the metadata that includes the one or more digital tags, to a digital platform—such as a website, a mobile application, and or other platform that is accessible by a user device (e.g., personal computer, mobile phone, mobile tablet, AR/VR device, etc.)—via the network 120.

An interactions monitor 128 of the content publisher 114 may then track user interactions with the generated digital content 102 in order to generate a user interaction report whenever a user engages with the generated digital content 102 that has been published. For example, if the generated digital content 102 is published to a web page as an advertisement and a user interacts with the generated digital content 102, the interactions monitor 128 generates an interaction report based on the interaction. Interactions include user actions such as selecting an element, streaming a video, sharing, selecting a 'Like' indicator, adding an item to a digital cart, completing a purchase of an item, reading, scrolling, and other actions a user completes with the generated digital content 102.

In some embodiments, the interaction report includes metadata associated with the user action as well as one or more of tags associated with the generated digital content 102 stored in the metadata associated with the generated digital content 102. For example, the interaction report can include, a timestamp corresponding to the user action, a URL for a web page where the content publisher 114 published the generated digital content 102, a user ID corresponding to the user who completed the action, an interaction type (e.g., click, view video, etc.), and one or more tags for a template type, image elements, headline length, keywords, sentiment, text readability, and any additional tags that were determined by the ML model 122 and associated with the generated digital content 102 by the content tagger 124. In some embodiments, an interaction event is enhanced and/or combined with metadata associated with the generated digital content 102 at a server to generate the interaction report or an enhanced interaction report. For example, when the interactions monitor 128 determines a user has interacted with the digital content and the interactions monitor 128 will generate a first interaction report that includes metadata associated with the interaction event and an identifier associated with the generated digital content 102. The system 100 then uses the identifier to identify metadata—which is stored at the data store 116—associated with the generated digital content 102. The identified metadata is then combined with the first interaction report to generate a second interaction report (e.g., enhanced interaction report) that includes, among other things, any tags that were determined by the ML model 122 and associated with the generated digital content 102 by the content tagger 124. In some embodiments, where the interactions monitor 128 is separate from the content publisher 114, the interactions monitor 128 sends the interaction report to the content publisher 114 and/or the data store 116, where the interaction report is stored in association with the user.

The affinity engine 112 accesses/receives one or more interaction reports that are associated with one or more users. The affinity engine 112 then uses affinity logic 126 to aggregate and/or process one or more interaction reports to generate and/or update an affinity profile for the one or more users. The affinity profile includes a set of user affinities (e.g., preferences, attractions, leanings, etc.) that are segmented into distinct categories—such as, preferred colors, headline length, reading level, sentiment, gender, background environment, activity, season, light level, image composition, and other characteristics for digital content. The affinity engine 112 accesses the one or more interaction reports to extract tags in the interaction report to generate, update, and/or modify affinity values associated with specific categories in the affinity profile. For example, when an interaction report includes a tag associated with a readability value (e.g., grade 4 reading level) and the affinity engine will update (e.g., add, subtract, average, or otherwise modify) a value for a readability category in the affinity profile. In some embodiments, the affinity logic 126 aggregates a set of interaction reports associated with a user and process the interaction reports to determine one or more similarities between the interaction reports for each of the different categories of the affinity profile.

Based on the amount of data (e.g., digital tags included in interaction reports) that is provided to the affinity logic 126, the affinity logic 126 further assigns a confidence level to a determined affinity. For example, the interactions monitor 128 might have generated several interaction reports for a user. The affinity logic 126 processes these reports and determine that 60% of the user's interaction reports include a digital tag associated with surfing. Based on this determination, the affinity logic 126 determines that the user's preferred activity is surfing. In other examples, the affinity logic 126 will not have enough information to determine a user's affinity for a particular category. Further, when the affinity logic 126 determines that the user has multiple affinities for a particular category, the affinity logic 126 will rank multiple user affinities in a category of the user's affinity profile. In some embodiments, the affinity logic 126 clusters users with similar affinity profiles to generate one or more user audiences. For example, the affinity logic 126 clusters together groups of users whom the affinity logic 126 has determined each have an affinity for digital content that has an informal sentiment, is related to fashion, and includes headlines that are 4 words or less.

In some embodiments, once one or more affinity profiles have been generated, the affinity engine 112 evaluates the generated digital content 102 in view of the affinity profiles to predict whether—and to what extent—a user and/or an audience associated with the affinity profiles will be attracted to the generated digital content 102. For example, the affinity engine 112 processes the generated digital content 102 by the ML model 122 to generate a digital tags associated with the generated digital content 102. A marketer then selects a user and/or an audience for the generated digital content 102.

Based on the digital tags and affinity profiles associated with the user and/or audience for the generated digital content 102, the affinity logic 126 compares a set of digital tags associated with the generated digital content 102 to the affinity profiles to determine similarities between the set of digital tags and the affinity profiles. For example, if the generated digital content 102 includes digital tags for "ocean," "surfing," and "woman" and the affinity profile shows that the user has a preference for content that depicts the ocean, surfing and men, then the affinity logic 126 determines that the generated digital content 102 aligns with the user's affinity profile for background environment (ocean) and activity (surfing), but does not align with the user's preferred gender depiction (men). In addition to each user being associated with an affinity profile, the affinity logic further aggregates a plurality of single user affinity profiles to generate an audience affinity profile for an audience of users. The audience of users includes each of the users that are associated with the single user affinity profiles that are used to generate the audience affinity profile. Each of the single user affinity profiles and the audience affinity profiles are stored in the data store 116 and accessed by the components of exemplary network environment 100

In some embodiments, similar to the methods described herein for analyzing/evaluating the generated digital content 102, the content analyzer 120 accesses a marketer's content library—that is stored at data store 116—to evaluate one or more items in view of one or more affinity profiles associated with the marketer's customers to recommend and/or retire content. In some examples, the affinity logic 126 compares tags generated by the ML model 122 for the items in the content library to provide content recommendations to the marketer based on a selected affinity profile for a user or audience. In some cases, the affinity logic is used to rank the content in the marketer's content library based on the selected affinity profiles (e.g., to promote content that includes desired characteristics for the selected affinity profiles towards the top of the content library). Additionally or alternatively, the affinity engine 112 uses the affinity profiles to proactively replace and/or remove content that has a low correlation with the affinity profiles associated with the marketer's customers.

Figure 2:
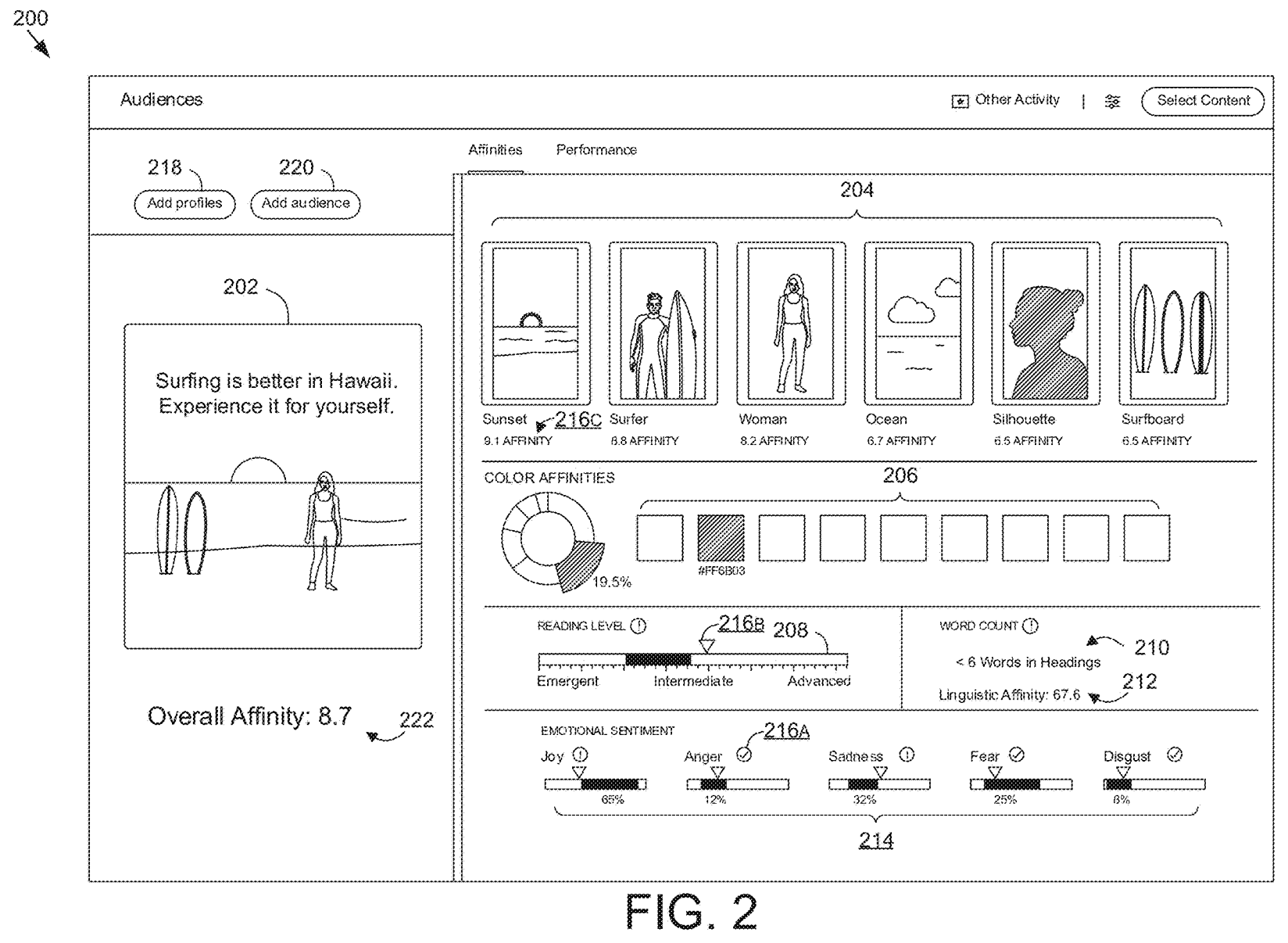

Turning now to FIG. 2, FIG. 2 illustrates an example user interface 200 for evaluating content in real-time based on one or more affinity profiles, in accordance with embodiments of the present disclosure. The user interface 200 includes content preview window 202, suggested content items 204, color affinities 206, reading level scale 208, word count preference 210, linguistic affinity score 212, emotional sentiment scales 214, affinity indicator 216, add profiles button 218, add audience button 220, and overall affinity score 222. Each of the suggested content items 204 have been previously evaluated by the system (e.g., affinity engine 112 of FIG. 1) to determine a set of tags for each of the suggested content items 204.

In operation, a marketer accesses the user interface 200—such as via the user devices 118 of FIG. 1—and select, modify, and/or generate digital content to be displayed in the content preview window 202. In some embodiments, a content editing application—such as Adobe AEM—is accessed by or integrated into the user interface 200 to allow the marketer to generate original content and/or modify content from a content library of the marketer. Initially, the marketer selects/adds/applies a user affinity profile or an audience affinity profile. For example, when the marketer selects the add audience button 220, the marketer will be presented with a list of users—such as the marketer's customers—and/or a list of previously generated audience affinity profiles. The marketer then identifies a target for digital content by selecting one or more of the users to generate a new audience, adding users to an existing audience, or selecting a previously generated audience. In some embodiments, a marketer can select a single user as the target and the systems and methods described herein are be implemented for the single user.

Once the marketer has identified a target for content, the system accesses a corresponding affinity profile for the target, which, in some instances, is an aggregate of a plurality of affinity profiles when the target is an audience that includes more than one user or a single affinity profile when the target is a single user. Based on the affinity profile for the target, the user interface 200 updates the suggested content items 204, the color affinities 206, the reading level scale 208, the word count preference 210, and the emotional sentiment scales 214, each with an indication of the target's preferences for content items, colors, reading level, word count and emotional sentiment. For example, a scale—such as the reading level scale 208—can shade in, blackout, or otherwise alter a portion of the scale to indicate that the target's preferred reading level is between emergent and intermediate. By way of further example, the user interface 200 will update the word count preference 210 with a numeric indicator to inform the marketer how many words the target prefers to be included in content they view.

The marketer then adds content to the content preview window 202. Content is added by selecting content items from the suggested content items 204, searching for content, generating content using a content editing application, or a combination of these methods. In some embodiments, although not depicted in FIG. 2, content editing tools are added to the user interface 200 to allow the marketer to edit/modify the content in the content preview window 202. Based on the content in the content preview window 202, the system—such as the affinity engine 112 of FIG. 1—processes the content in the content preview window 202 in view of the target's affinity profile to determine similarities/differences between digital tags for the content in the content preview window 202 and the target's affinity profile. For example, the system can process a title included in the content shown in the content preview window 202 to determine a linguistic affinity score (e.g., linguistic affinity score 212) for the title based on the target's preferences from the target's affinity profile.

By processing the content in the content preview window 202, the user interface 200 updates each of the suggested content items 204, color affinities 206, reading level scale 208, linguistic affinity score 212, emotional sentiment scales 214, and overall affinity 222 with affinity indicators, such as affinity indicators 216A/B/C. The affinity indicators 216A/B/C indicate how well aligned the content in the content preview window 202 aligns with the target's affinity profile. For example, affinity indicator 216A can include a checkmark to indicate that the content aligns with the target's emotional sentiment preference with respect to the content including an angry sentiment. Affinity indicator 216B provides an arrow to indicate where the content in the content preview window 202 lands on the reading level scale 208. This provides the marketer with a visual indication to inform the marketer how they are able to adjust their content to be more similar to the target's preferences in the affinity profile. The affinity indicator 216C provides a score to indicate how similar the content item is to the target affinity profile. Similarly, the system aggregates computed affinities for the content in the content preview window 202 for each category in the target's affinity profile to generate the overall affinity 222. Advantageously, the marketer views a real-time prediction for how well the content in the content preview window 202 will be received by the target. Moreover, the marketer is provided with granular feedback to inform the marketer which characteristics of the content are changed in order for the content to better align with the target's preferences.

Exemplary Implementations of the Present Disclosure

Figure 4:
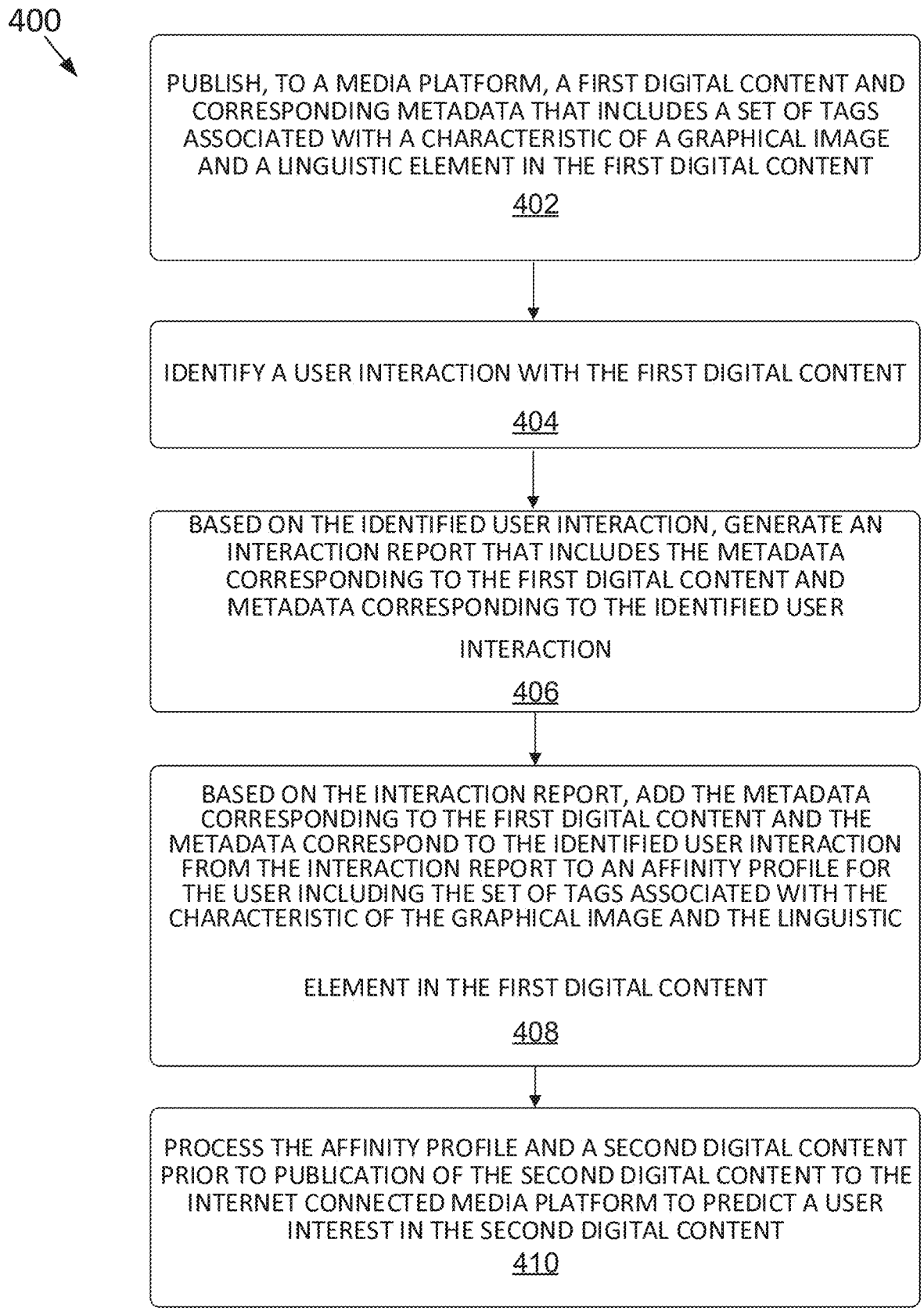
FIG. 4 provides a second example method for determining user affinities by tracking user interactions with tagged digital content and using the user affinities in content generation applications, in accordance with aspects of the technology described herein.

As described, various implementations can be used in accordance with embodiments described herein. FIGS. 3-5 provide methods of determining user affinities by tracking user interactions with tagged digital content and using the user affinities in content generation applications, in accordance with embodiments described herein. The methods 300, 400 and 500 can be performed by a computer device, such as device 600 described below. The flow diagrams represented in FIGS. 3-5 are intended to be exemplary in nature and not limiting.

Turning initially to method 300 of FIG. 3, method 300 is directed to one implementation of determining user affinities by tracking user interactions with tagged digital content and using the user affinities in content generation applications, in accordance with embodiments of the present technology. Initially, the method 300, at block 302, includes publishing, to an internet connected media platform, a first digital content and corresponding metadata that includes a set of tags associated with a characteristic of a graphical image and a linguistic element in the first digital content. For example, after the one or more tags have been embedded within the metadata associated with the digital content, the system uploads and publishes the digital content—e.g., using a service/application such as AEM-along with the metadata that includes the one or more tags, to a digital platform—such as a website, a mobile application, and or other platform that is accessible by a user device (e.g., personal computer, mobile phone, mobile tablet, AR/VR device, etc.).

The method 300, at block 304, includes identifying a user interaction by a user with the first digital content. For example, an interactions monitor of the content publisher tracks user interactions with the generated digital content.

The method 300, at block 306, includes based on the identified user interaction by the user, generating an affinity profile for the user by accessing an interaction report that includes the set of tags associated with the characteristic of the graphical image and the linguistic element in the first digital content, and modifying at least one affinity value for a graphical category or a linguistic category based on the set of tags included in the interaction report. For example, an affinity engine uses affinity logic to aggregate and/or process one or more interaction reports, that includes metadata associated with an identified user interaction, to generate an affinity profile for the one or more users. The affinity profile includes a set of user affinities (e.g., preferences, attractions, leanings, etc.) that are segmented into distinct categories—such as, preferred colors, headline length, reading level, sentiment, gender, background environment, activity, season, light level, image composition, and other characteristics for digital content. The affinity engine accesses the one or more interaction reports to extract tags in the interaction report to generate, update, and/or modify affinity values associated with specific categories in the affinity profile. For example, when an interaction report includes a tag associated with a readability value (e.g., grade 4 reading level), the affinity engine will update (e.g., add, subtract, average, or otherwise modify) a value for a readability category in the affinity profile.

The method 300, at block 308, includes processing the affinity profile and a second digital content prior to publication of the second digital content to the internet connected media platform to determine a similarity between the affinity profile and the second digital content for the graphical category and the linguistic category. For example, the system processes generated digital content—such as digital content for a target audience shown in a content preview window—and a user interface updates suggested content items, color affinities, a reading level scale, a linguistic affinity score, emotional sentiment scales, and an overall affinity score with affinity indicators that indicate how well the content aligns with a target's affinity profile.

With reference now to FIG. 4, method 400 of FIG. 4 is directed to another example implementation of determining user affinities by tracking user interactions with tagged digital content and using the user affinities in content generation applications, in accordance with embodiments of the present technology. The method 400, at block 402, includes publishing, to a media platform, a first digital content and corresponding metadata that includes a set of tags associated with a characteristic of a graphical image and a linguistic element in the first digital content. For example, after the one or more tags have been embedded within the metadata associated with the digital content, the system uploads and publishes the digital content—e.g., using a service/application such as AEM-along with the metadata that includes the one or more tags, to a digital platform—such as a website, a mobile application, and or other platform that is accessible by a user device (e.g., personal computer, mobile phone, mobile tablet, AR/VR device, etc.).

The method 400, at block 404, includes identifying a user interaction with the first digital content. For example, an interactions monitor of the content publisher then tracks user interactions with the generated digital content.

The method 400, at block 406, includes based on the identified user interaction, generating an interaction report that includes the metadata corresponding to the first digital content and metadata corresponding to the identified user interaction. For example, an interactions monitor of the content publisher tracks user interactions with digital content in order to generate a user interaction report whenever a user engages with the digital content that has been published.

The method 400, at block 408, includes based on the interaction report, adding the metadata corresponding to the first digital content and the metadata corresponding to the identified user interaction from the interaction report to an affinity profile for the user including the set of tags associated with the characteristic of the graphical image and the linguistic element in the first digital content. For example, an affinity engine uses affinity logic to aggregate and/or process one or more interaction reports to generate and/or update an affinity profile for the one or more users using metadata of content that was interacted with and metadata of an interaction with the content by a user. The affinity profile includes a set of user affinities (e.g., preferences, attractions, leanings, etc.) that are segmented into distinct categories—such as, preferred colors, headline length, reading level, sentiment, gender, background environment, activity, season, light level, image composition, and other characteristics for digital content.

The method 400, at block 410, includes processing the affinity profile and a second digital content prior to publication of the second digital content to the internet connected media platform to predict a user interest in the second digital content. For example, the system processes generated digital content—such as digital content for a target audience shown in a content preview window—and a user interface updates suggested content items, color affinities, a reading level scale, a linguistic affinity score, emotional sentiment scales, and an overall affinity score with affinity indicators that indicate how well the content aligns with a target's affinity profile.

With reference now to FIG. 5, method 500 of FIG. 5 is directed to another example implementation of determining user affinities by tracking user interactions with tagged digital content and using the user affinities in content generation applications, in accordance with embodiments of the present technology. The method 500, at block 502, includes generating an affinity profile for a user, the affinity profile including a first set of tags associated with a first set of characteristics of a first graphical image and a first linguistic element in a first digital content. For example, the system aggregates and/or processes one or more interaction reports to generate an affinity profile for a user and one or more tags included in the interaction report are stored in association with the affinity profile.

The method 500, at block 504, includes identifying a second set of tags associated with a second set of characteristics of a second graphical image and a second linguistic element in a second digital content. For example, a marketer generates digital content for a target user or audience of users and the system processes the digital content to generate a set of tags for the digital content.

The method 500, at block 506, includes processing, by a machine learning model, the second set of tags associated with the second digital content and the first set of tags in the affinity profile of the user to determine an extent of similarity between the second set of tags associated with the second digital content and the first set of tags in the affinity profile of the user. For example, based on the second set of tags, the system evaluates the second digital content in view of the affinity profile for the target user/audience to determine similarities or differences between the digital content and the affinity profile.

The method 500, at block 508, includes providing, for display, the extent of similarity to indicate a predicted user affinity for the second digital content. For example, the system processes generated digital content—such as digital content for a target audience shown in a content preview window—and a user interface updates suggested content items, color affinities, a reading level scale, a linguistic affinity score, emotional sentiment scales, and an overall affinity score with affinity indicators that indicate how well the content aligns with a target's affinity profile.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 6:
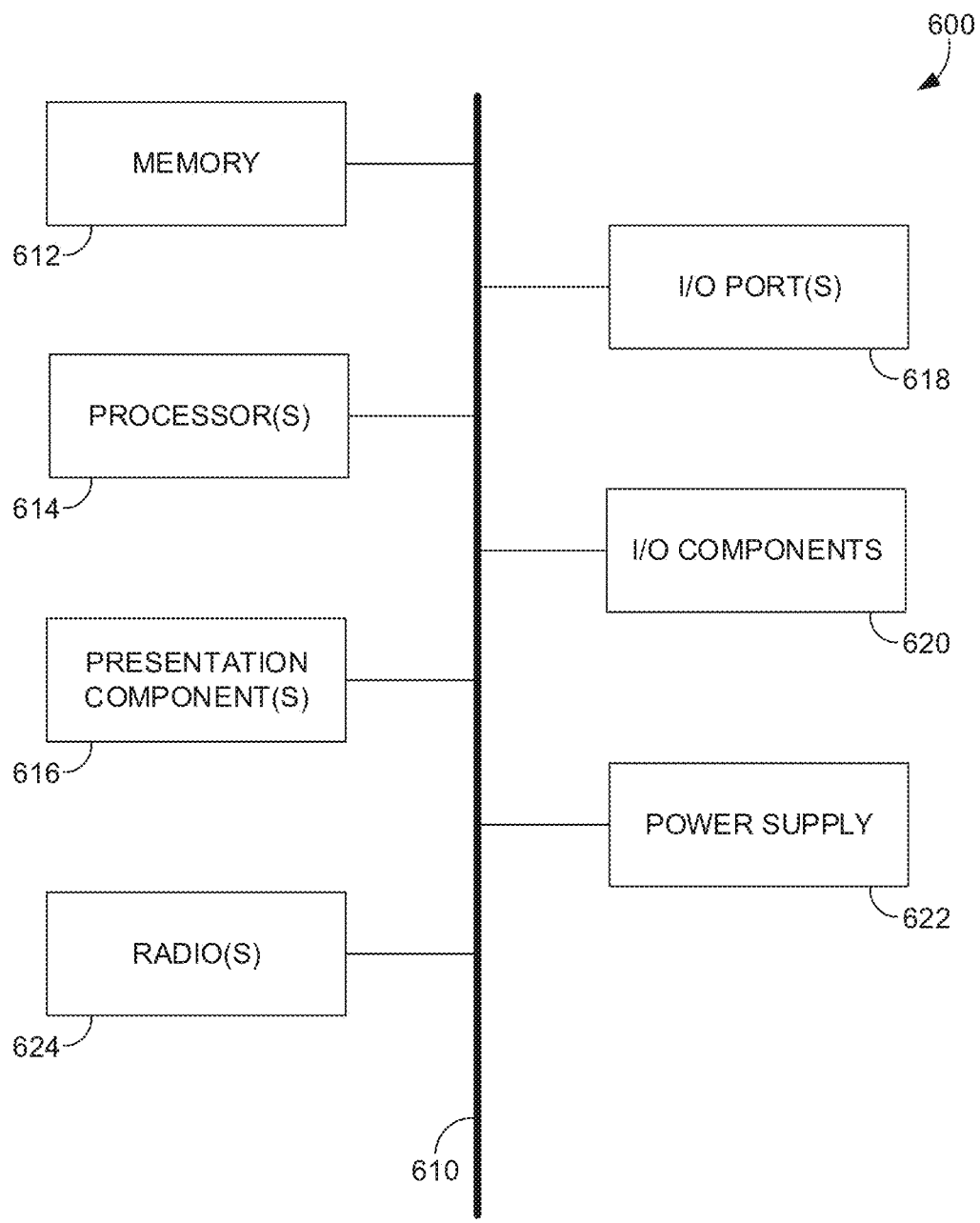
FIG. 6 is a block diagram of an exemplary computing environment suitable for use in implementing aspects of the technology described herein.

Referring to the drawings in general, and initially to FIG. 6 in particular, an exemplary operating environment for implementing aspects of the technology described herein is shown and designated generally as computing device 600. Computing device 600 is just one example of a suitable computing environment and is not intended to suggest any limitation as to the scope of use or functionality of the technology described herein. Neither should the computing device 600 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 6, computing device 600 includes a bus 610 that directly or indirectly couples the following devices: memory 612, one or more processors 614, one or more presentation components 616, input/output (I/O) ports 618, I/O components 620, an illustrative power supply 622, and a radio(s) 624. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 6 is merely illustrative of an exemplary computing device that can be used in connection with one or more aspects of the technology described herein. Distinction is not made between such categories as "workstation," "server," "laptop," and "handheld device," as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer storage media in the form of volatile and/or nonvolatile memory. The memory 612 may be removable, non-removable, or a combination thereof. Exemplary memory includes solid-state memory, hard drives, and optical-disc drives. Computing device 600 includes one or more processors 614 that read data from various entities such as bus 610, memory 612, or I/O components 620. Presentation component(s) 616 present data indications to a user or other device. Exemplary presentation components 616 include a display device, speaker, printing component, and vibrating component. I/O port(s) 618 allow computing device 600 to be logically coupled to other devices including I/O components 620, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 614 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 600. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

A computing device may include radio(s) 624. The radio 624 transmits and receives radio communications. The computing device may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A non-transitory computer-readable medium storing executable instructions, which when executed by a processing device, cause the processing device to perform operations comprising:

receive, at a user interface of a content editing application, a selection of a target audience of one or more digital content users;

access an affinity profile associated with the target audience, wherein the affinity profile represents one or more tracked user interactions by users of the target audience with published first digital content, wherein the affinity profile further represents affinity values associated with one or more tags representing one or more characteristics of the first digital content, wherein a first set of tags of the one or more tags are associated with at least one of a characteristic of a graphical image or a linguistic element in the first digital content, the first set of tags embedded within metadata associated with the first digital content;

determine a second set of tags representing one or more characteristics of second digital content displayed on the user interface of the content editing application, wherein the second set of tags are associated with at least one of a characteristic of a graphical image or a linguistic element in the second digital content displayed on the user interface;

process the affinity profile and the second digital content displayed on the user interface to determine a set of similarities based on the second set of tags and affinity values associated with one or more tags from the first set of tags of the affinity profile;

display one or more affinity indicators on the user interface, wherein each of the one or more affinity indicators indicates an affinity score for each characteristic of the one or more characteristics of the digital content, based on the set of similarities;

modify, via the user interface, the second digital content based on at least one input received via the user interface, wherein the modified second digital content has an increased set of similarities with the affinity profile; and publish, via a network to a media platform, an output of third digital content from the content editing application based on the modified second digital content.

2. The non-transitory computer-readable medium storing executable instructions of claim 1, the operations further comprising:

display one or more content items from a library to suggest elements for inclusion in the second digital content displayed on the user interface based on computing the affinity score for the elements using the affinity profile.

3. The non-transitory computer-readable medium storing executable instructions of claim 2, the operations further comprising:

rank the one or one or more content items in the library based at least on the affinity profile.

4. The non-transitory computer-readable medium storing executable instructions of claim 1, wherein the affinity profile comprises an aggregate of a plurality of single user affinity profiles.

5. The non-transitory computer-readable medium storing executable instructions of claim 1, the operations further comprising:

generate the second set of tags based on applying the published first digital content to a machine learning model.

6. The non-transitory computer-readable medium storing executable instructions of claim 1, wherein the affinity profile is generated based on publication of the published first digital content to the media platform with corresponding metadata that includes the first set of tags, and identifying the one or more user interactions with the published first digital content.

7. The non-transitory computer-readable medium storing executable instructions of claim 1, the operations further comprising:

process, by a machine learning model, the second digital content to generate the second set of tags; and compare the second set of tags to the affinity profile to determine similarities or differences between the second set of tags and the affinity profile.

8. The non-transitory computer-readable medium storing executable instructions of claim 1, the operations further comprising:

using the affinity profile, cause a display of a suggestion of third digital content, wherein the suggestion is determined based on a similarity between the affinity profile and the second digital content.

9. The non-transitory computer-readable medium storing executable instructions of claim 1, wherein the one or more affinity indicators include one or more of: a color affinity, a reading level, a word count preference, a linguistic affinity, an emotional sentiment, and an overall affinity.

10. A method one comprising:
- receiving, from a user interface of a content editing application, a selection of a target audience of one or more digital content users;
- displaying first digital content on a content preview window of a user interface;
- determining a first set of tags representing one or more characteristics of the first digital content, wherein the first set of tags are associated with at least one of a characteristic of a graphical image or a linguistic element in the first digital content displayed on the user interface;
- accessing an affinity profile associated with the target audience, wherein the affinity profile represents one or more tracked user interactions by users of the target audience with published second digital content, wherein the affinity profile further represents affinity values associated with one or more tags representing one or more characteristics of the second digital content, wherein a first set of tags of the one or more tags are associated with at least one of a characteristic of a graphical image or a linguistic element in the second digital content, the first set of tags embedded within metadata associated with the second digital content;
- processing the affinity profile and the first digital content displayed on the user interface to determine a set of similarities based on the first set of tags and affinity values associated with one or more tags from the first set of tags of the affinity profile;
- computing an affinity score for individual characteristics of the one or more characteristics based on the set of similarities; and
- displaying one or more affinity indicators on the user interface, wherein each of the one or more affinity indicators indicates the affinity score for each characteristic of the one or more characteristics
- modifying, via the user interface, the first digital content based on at least one input received via the user interface, wherein the modified first digital content has an increased set of similarities with the affinity profile; and
- publishing, via a network to a media platform, an output of third digital content from the content editing application based on the modified second digital content.

11. The method of claim 10, wherein the one or more affinity indicators include the affinity score for one or more of: a color affinity, a reading level, a word count preference, a linguistic affinity, an emotional sentiment, and an overall affinity.

12. The method of claim 10, the method further comprising:
- displaying one or more content items from a library to suggest elements for inclusion in the first digital content displayed on the user interface based on computing the affinity score for the elements using the affinity profile.

13. The method of claim 12, the method further comprising:
- ranking the one or one or more content items in the library based at least on the affinity profile.

14. The method of claim 10, wherein the affinity profile comprises an aggregate of a plurality of single user affinity profiles.

15. The method of claim 10, the method further comprising:
- generating the first set of tags based on applying the published first digital content to a machine learning model.

16. A system comprising:
- at least one memory component; and
- one or more processing devices coupled to the at least one memory component, the one or more processing devices to perform operations comprising:
- receive, at a user interface of a content editing application, a selection of a target audience of one or more digital content users;
- access an affinity profile associated with the target audience, wherein the affinity profile represents one or more tracked user interactions by users of the target audience with published first digital content, wherein the affinity profile further represents affinity values associated with one or more tags representing one or more characteristics of the first digital content, wherein a first set of tags of the one or more tags are associated with at least one of a characteristic of a graphical image or a linguistic element in the first digital content, the first set of tags embedded within metadata associated with the first digital content;
- determine a second set of tags representing one or more characteristics of second digital content displayed on the user interface of the content editing application, wherein the second set of tags are associated with at least one of a characteristic of a graphical image or a linguistic element in the second digital content displayed on the user interface;
- process the affinity profile and the second digital content displayed on the user interface to determine a set of similarities between the second set of tags and affinity values associated with one or more tags from the first set of tags of the affinity profile;
- compute an affinity score for individual characteristics of the one or more characteristics based on the set of similarities; and
- display one or more affinity indicators on the user interface, wherein each of the one or more affinity indicators indicates the affinity score for each characteristic of the one or more characteristics;
- modify, via the user interface, the second digital content based on at least one input received via the user interface, wherein the modified second digital content has an increased set of similarities with the affinity profile; and
- publish, via a network to a media platform, an output of third digital content from the content editing application based on the modified second digital content.

17. The system of claim 16, the operations further comprising:
- display one or more content items from a library to suggest elements for inclusion in the second digital content displayed on the user interface based on computing the affinity score for the elements using the affinity profile.

18. The system of claim 16, the operations further comprising:
- generate the first set of tags based on applying the published first digital content to a machine learning model.

19. The system of claim 16, the operations further comprising:
- generate the affinity profile based on publication of the published second digital content to the media platform with corresponding metadata that includes the first set of tags, and identify the one or more user interactions with the published first digital content.

20. The system of claim 16, the operations further comprising:
process, by a machine learning model, the second digital content to generate the second set of tags; and
compare the second set of tags to the affinity profile to determine similarities or differences between the second set of tags and the affinity profile.

\* \* \* \* \*